United States Patent [19]

von der Heyde et al.

[11] 4,130,928
[45] Dec. 26, 1978

[54] METHOD FOR MOUNTING A TIRE BLADDER

[75] Inventors: Richard C. von der Heyde, Warken; William J. Head, Rollingen (Mersch), both of Luxembourg

[73] Assignee: The Goodyear Tire & Rubber Company, Akron, Ohio

[21] Appl. No.: 719,047

[22] Filed: Aug. 30, 1976

[51] Int. Cl.² .......................... B23P 9/00; B23P 19/02
[52] U.S. Cl. ........................................ 29/450; 29/235; 156/126
[58] Field of Search ............... 156/110 R, 123 R, 126, 156/128 R, 128 I, 132, 394 R, 400, 401, 414, 415, 416, 417, 418, 419, 420; 29/235, 428, 450

[56] References Cited

U.S. PATENT DOCUMENTS

| | | | |
|---|---|---|---|
| 1,488,901 | 4/1924 | Armstrong | 29/235 |
| 1,676,236 | 7/1928 | Armstrong | 29/235 |
| 2,830,361 | 4/1958 | Bruner | 29/235 |
| 3,151,013 | 9/1964 | Nebout | 156/126 |
| 3,531,355 | 9/1970 | Riddle | 156/394 |
| 3,605,239 | 9/1971 | Eschholz | 29/235 |
| 3,704,189 | 11/1972 | Varga | 156/110 R |

*Primary Examiner*—John E. Kittle
*Attorney, Agent, or Firm*—R S Washburn

[57] ABSTRACT

A method for mounting or installing on a tire building machine an annular inflatable bladder for use in turning or folding the edge of a ply disposed around the building drum about a bead ring or a fold line. The method employs a collapsible cylindrical form which can comprise a split cylindrical ring or a cylindrical array of strips placed inside the annular bladder, which form is expanded to permit its movement axially over the drum. The method enables the bladders to be placed or replaced on the drum without dismantling the drum and particularly without requiring that the drum be removed from the shaft on which it is mounted thereby reducing the time required for installation of the bladder and the out-of-service time of the building drum.

5 Claims, 7 Drawing Figures

METHOD FOR MOUNTING A TIRE BLADDER

The foregoing abstract is not to be taken as limiting the invention of this application, and in order to understand the full nature and extent of the technical disclosure of this application, reference must be made to the accompanying drawing and the following detailed description.

The present invention relates to tire building drums and the like and particularly to a method of mounting a turn-up bladder or like annular member on such building drum.

Heretofore, it has been necessary to remove a building drum from the tire machine on which it is mounted and at least partly to dismantle the drum in order to replace a turn-up or folder bladder on the drum. The principal object of the invention is to reduce the effort and out-of-service time of the tire building drum in the course of installing or reinstalling a turn-up bladder thereon.

The objects stated and other objects and advantages are accomplished in accordance with the invention by a method of mounting an annular elastomeric member on a tire building drum supported on a cantilevered shaft, which method comprises placing a collapsible cylindrical form in the member to support its radially inward surface at a diameter greater than the maximum diameter of the drum, expanding the form within the member, passing the member and the form axially over the drum, locating the member in a predetermined axial relation with the drum, and removing the form, whereby the annular member can be mounted on the drum without removing the drum from the shaft.

To acquaint persons skilled in the art with the principles of the invention, certain preferred embodiments thereof are described hereinbelow illustrating the best mode presently contemplated for the practice of the invention, making reference to the attached drawings wherein.

Figure 1:
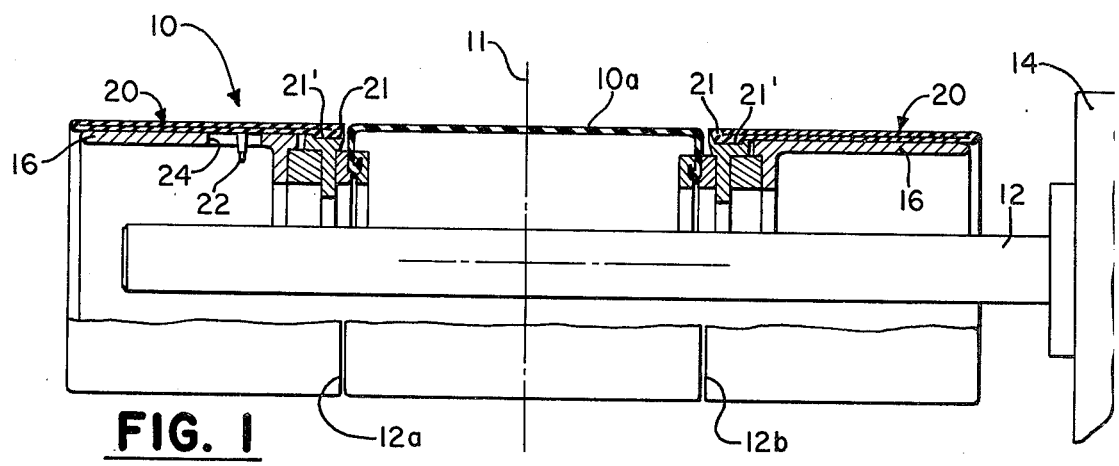
FIG. 1 is a schematic representation, partially in cross-section, of a tire building drum.

Referring now to the drawings and particularly to FIG. 1, a building drum 10, known in the prior art, is illustrated for the purpose of clarifying the description of the invention. The drum includes a central portion 10a having a cylindrical surface disposed symmetrically with respect to the plane 11. The drum is mounted for rotation on a shaft 12 which is supported as a cantilever in a building machine housing 14. At each end, that is, the outboard end 12a and the inboard end 12b of the drum, there are attached coaxially the drum extensions 16 which support the respective turn-up bladders 20 which are identical. Each turn-up bladder is secured to the building drum by the cooperation of a non-inflatable, elastomeric ring 21 formed integrally with the bladder, and which ring is seated conjugately in a circumferential groove 21' adjacent the respectively associated end of the central drum portion 10a.

For purposes of illustration, the outboard bladder is shown having an inflation air connection nipple 22 molded integrally therein which nipple extends through a slot 24 formed in the bladder supporting drum extension 16 and is connected with conduit means disposed in the drum. This arrangement is in accordance with the prior art.

It will be apparent that replacement of the turn-up bladder, particularly that bladder at the inboard end of the drum presents some problems.

The present invention is directed to a solution of the problems.

Figure 2:
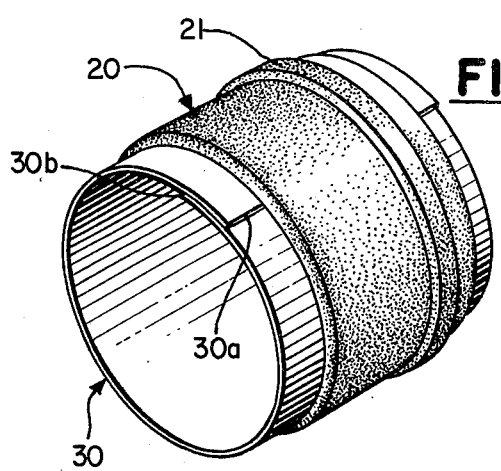
FIG. 2 is a perspective illustration of a split metal cylinder employed in the practice of the invention.
Figure 3:
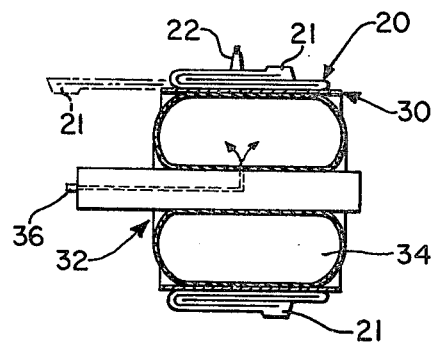
FIG. 3 is a schematic representation, in axial cross-section, of means for expanding the annular member and the metal cylinder of FIG. 2.

In accordance with the invention, the bladder 20, or like annular member, is first draped about a collapsed thinwall metal ring 30 illustrated in FIG. 2. Before the turn-up bladder 20 is placed about the collapsed metal ring 30, a portion of the bladder is turned outward and back on the remaining portion to form a cuff having the ring 21 outward as illustrated in FIG. 3. The thin-wall metal cylinder then, with the bladder draped therearound, is disposed circumferentially about a fixture 32, FIG. 3, having an inflatable annular tube 34 fixed therearound. The fixture has means represented at 36 to introduce compressed air into the tube 34 the expansion of which expands the ring 30 to an inside diameter which is at least slightly greater than the outside diameter of the building drum 10, also expanding the bladder 20. The expansion of the split metal ring is such that the respective edges 30a, 30b of the split are brought into abutting relation. When the respective edges are in abutment, the ring is sufficiently rigid to maintain its cylindrical condition and its enlarged inside diameter, and the tube 34 is then deflated and the fixture 32 with the tube 34 removed from within the ring 30.

The ring 30 and the expanded turn-up bladder or member 20 are then moved axially over the drum 10 from the outboard to the inboard end and are disposed about the bladder support extension 16 in the longitudinal location with respect to the circumferential grooves 21' such that when the portion of the bladder which had been turned outwardly to form the cuff is again turned inwardly, it will be disposed in its predetermined conjugate relation with the groove 21'.

Before the cuff is turned inward the edges 30a, 30b are manually brought out of their abutting relation and the ring 30 is removed from between the bladder 20 and the bladder support extension and removed over the drum 10.

As thereafter the cuff and ring 21 are turned inward, the nipple 22 can be entered in the slot 24 and connected for air flow with the air conduit means of the drum.

The ring 30 which has hereinbefore been described as metal ring may alternatively consist of other suitable materials, such as plastics, such as for instance nylon.

Figure 4:
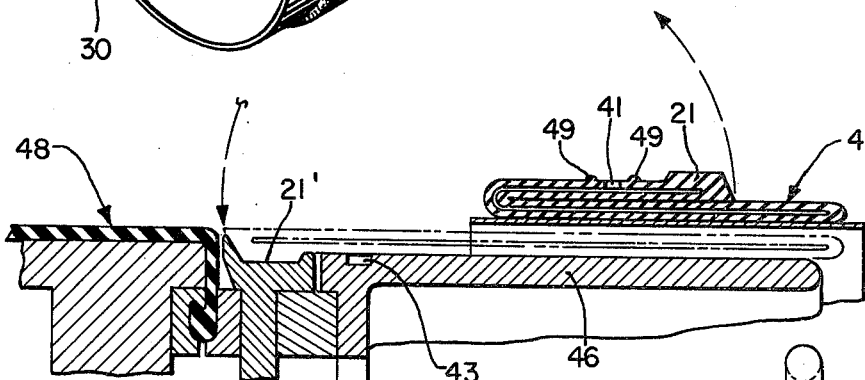
FIG. 4 is a schematic representation in axial cross-section of the installation of the annular member on the drum of FIG. 1.

In FIG. 4, an alternate form of turn-up bladder member is illustrated. In the bladder 40, air connection to the drum is provided by a flangeless hole 41 (instead of the nipple) which cooperates with a circumferential channel 43 open outwardly in the drum extension 46 of the drum 48. The bladder 40 has a pair of sealing ridges 49 which engage the cylindrical surface of the drum extension, one at each side of the open channel. The channel is permanently connected to the air conduit means of the drum. The bladder 40 has the advantage of being mounted without regard to angular alignment as is required of the nipple 22 and the slot 24 of the bladder 20.

Figure 5:
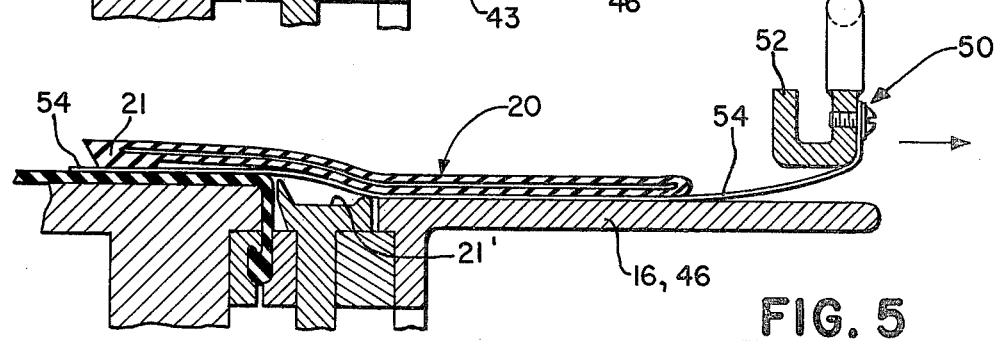
FIG. 5 is a schematic representation of a flexible cylindrical form alternatively useful in the practice of the invention.

An alternative device by which the invention can be carried out is illustrated in FIG. 5. The device 50 comprises a rigid ring 52 of a diameter slightly greater than the outside diameter of the building drum 10 or 48. Firmly secured to the ring is an array of flexible strips 54 of, for example, flat wire of length greater than the axial length of the turn-up bladder to be installed. The flexible strips 54 are closely spaced around the circumference of the ring 52. To install the bladder, the ring is disposed close to the axially outer end of the drum extension, e.g., 16 or 46, with the array of flexible strips extending axially outward therebeyond. The bladder to be installed is then placed around the flexible strips generally coaxially with the drum. The ring is then pulled coaxially of the drum. The interaction of the flexible strips with the drum is sufficient to expand the bladder so that its inside diameter is greater than the outside diameter of the drum. The form provided by the flexible strips is moved axially to locate the annular member in a predetermined axial relation with the drum and in particular such that the ring 21 is aligned with the selected groove 21' in the drum. Then while the bladder is held in such axial relation with the drum, the form is pulled axially from between the bladder and the drum surface. A suitable lubricant can be applied to the flexible strips if desired. It may also be desirable to protect the central drum portion, particularly if the drum is equipped with an elastomeric center sleeve, with a sheet metal cover or the like.

The flexible strips can be formed of materials such as, for example, nylon.

Figure 6:
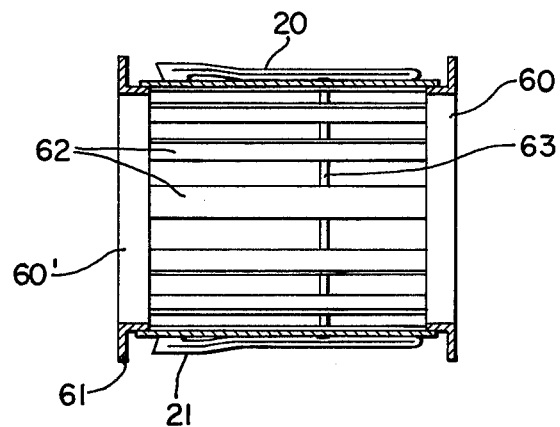
FIG. 6 is a representation in axial cross-sectional view of another and preferred collapsible cylindrical form employed in the practice of the invention.
Figure 7:
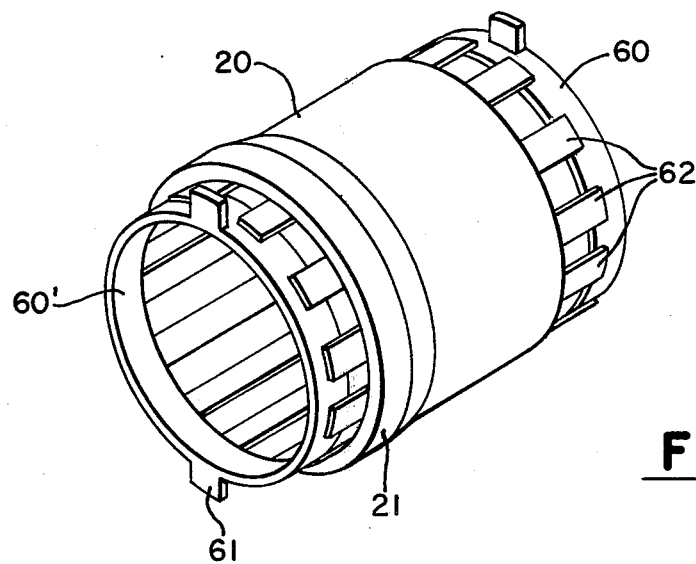
FIG. 7 is a perspective illustration of the form of FIG. 6.

A further alternative and presently preferred device by which the invention can be carried out is illustrated in FIGS. 6 and 7. In this case the turnup bladder 20 is expanded by a fixture as in FIG. 3, but in place of the thin wall metal cylinder 30 a number of strips 62 are inserted, spaced around the circumference with their length generally parallel with the axis of the cylinder. The strips may be of any suitable material such as for instance steel and may be kept together by suitable means such as a circumferential elastic band 63.

The bladder is expanded to such a diameter that rings 60, 60' may be inserted at both ends such that when the tube is deflated the ends of the strips 62 are supported on the rings 60, 60'. The inside diameter of the rings 60, 60' must be at least slightly greater than the diameter of the building drum.

The assembly of bladder 20, strips 62 and rings 60, 60' is then moved axially over the building drum into the correct location with respect to the circumferential grooves 21'.

The rings 60, 60' are then removed from engagement with the strips, normally by hammer blow on the ears 61.

The rings can then be removed over the drum 10 and the metal strips 62 pulled out from between the bladder and bladder support extension.

The alternate form of turnup bladder illustrated in FIG. 4 may be mounted without turning back to form a cuff.

While certain representative embodiments and details have been shown for the purpose of illustrating the invention, it will be apparent to those skilled in the art that various changes and modifications may be made therein without departing from the spirit or scope of the invention.

What is claimed is:

1. The method of mounting an inflatable ply turnup bladder on a tire building drum, the drum having a center part and bladder support means attached to and extending axially outward from the respective ends of the center part and mounted rotatably on a cantilevered shaft supported rotatably in a tire building machine housing, the drum having inflation means therein for conducting air to said turnup bladder, said method providing for mounting said bladder on one of said support means between said part and said housing while said drum is mounted on said shaft and without disassembly of any part of the drum, and comprising placing a collapsible form means in coaxial engagement with the radially inward surface of said bladder apart from said drum and in the deflated condition thereof, said form means being at least equal in axial length to the axial length of said bladder when the same is expanded, expanding the form means and the bladder therearound by an inflatable expanding means and fixing the so-expanded form means at a diameter sufficiently greater than the maximum diameter of said drum, then collapsing said expanding means and passing the form means freely coaxially thereover to locate said bladder in axial register with the one of said support means adjacent said housing then collapsing said form means while the bladder is in axial register with said one bladder support means and removing the collapsed form means from between the bladder and the bladder support means, whereby said ply turnup bladder is mounted on the drum without removal or disassembly thereof from said building machine housing.

2. Method of mounting a ply turnup bladder on a tire building drum, said drum having a center section and bladder support extensions, said drum being mounted on a cantilevered shaft rotatably fixed at its inboard end in a tire building machine housing, said method comprising providing an annular tubular toroidally inflatable bladder to be installed on said drum, providing a thinwalled, cylindrical form having an axial split defined by edges abuttable to define the maximum diameter of said form and separable to collapse the form to a lesser diameter, collapsing said form; draping said bladder freely about said form between the axial ends thereof;

disposing said form and said bladder therearound circumferentially about inflatable expanding means, expanding said form and said bladder therearound to cause said edges to abut, deflating said expanding means, removing said form and said bladder therewith and transporting the same from said expanding means to said tire building drum, moving said form with said bladder thereon freely over said center section from said outboard end to said support extension adjacent said machine housing, positioning said form and said bladder in axial registry with said extension, collapsing said form, engaging said bladder and said extension, and removing said form from between said bladder and said extension.

3. Method as claimed in claim 2, further comprising, before said draping, the step of turning an axial end portion of said bladder outward and over in contact with the remaining portion thereof to form a cuff and, after said collapsing of said form, turning said portion forming said cuff over and inward to register the bladder axially of said extension.

4. Method of mounting a turnup bladder on a building drum, said drum having a center section and a bladder support extension said drum being mounted on a cantilevered shaft supported at its inboard end in a housing, said method comprising providing an annular toroidally inflatable bladder to be installed in said drum, providing apart from said drum a fixture having an inflatable member, selecting a plurality of steel strips longer than the axial length of said bladder and a pair of end rings each having an inside diameter greater than the maximum diameter of said center section of said drum, arranging said strips in spaced parallel cylindrical array about said member, draping said bladder about said array of strips and said member while the latter is in a deflated condition, expanding said member, said array of strips, and said bladder, to a cylindrical form having a diameter sufficient to receive said end rings, inserting said end rings respectively one coaxially in each end of said array of strips, deflating said member to engage said strips and said rings to support said bladder in an expanded condition, transporting said form from said fixture to said building drum, moving said array with said bladder thereon over said drum beyond said center section toward said housing, positioning said array and said bladder in axial registry with said extension adjacent said housing, displacing said rings from said array of strips to collapse said array and removing said strips individually from between said bladder and said extension.

5. The method of mounting an inflatable ply turnup bladder on a tire building drum, the drum having a center part and bladder support means attached to and extending axially outward from the respective ends of the center part and mounted rotatably on a cantilevered shaft supported rotatably in a tire building machine housing, the drum having inflation means therein for conducting air to said turnup bladder, said method providing for mounting said bladder on the one of said support means extending from said center part toward said housing while said drum is mounted on said shaft and without disassembly of any part of the drum, and comprising placing said bladder in a deflated condition thereof circumferentially about and between the axial ends of said collapsible form means, disposing said form means and the bladder therearound on an inflatable form expanding means, expanding said form means to a predetermined diameter, fixing the so-expanded form means at said diameter greater than the maximum diameter of said drum, then collapsing said expanding means, transporting said form means and said bladder therearound from said expanding means to said drum, and passing the form means freely axially over said center section to locate said bladder in axial register with said one support means adjacent said housing, then collapsing said form means while the bladder thereon is in axial register with said one bladder support means and removing the collapsed form means from between the bladder and said one bladder support means, whereby said ply turnup bladder is mounted on the drum without removal or disassembly thereof from said building machine housing.

* * * * *